Aug. 4, 1970     KARL-HEINZ WESSEL     3,522,632
SHOE SOLE MOLDING UNIT

Filed April 28, 1967                                    3 Sheets-Sheet 1

United States Patent Office 3,522,632
Patented Aug. 4, 1970

3,522,632
SHOE SOLE MOLDING UNIT
Karl-Heinz Wessel, Vlotho, Germany, assignor to
Friedrich Stubbe, Vlotho, Germany
Filed Apr. 28, 1967, Ser. No. 634,711
Claims priority, application Germany, May 2, 1966,
St 25,325
Int. Cl. B29c 1/00
U.S. Cl. 18—42                                   3 Claims

ABSTRACT OF THE DISCLOSURE

An improved shoe sole injection molding unit which may be easily adjusted to provide for fabrication of various sole thicknesses. A shoe sole mold cavity is defined by a sole plate, lateral jaws and a last which carries the shoe upper. The mold parts are mounted on a molding unit. The lateral jaws are mounted in a mold box. The mold box, the last, and the sole plate are independently and vertically adjustable to provide varying shoe sole thicknesses without time consuming replacement of mold parts as was necessary in prior art devices.

BACKGROUND OF THE INVENTION

The invention relates to a mold carrying unit and in particular to turn table injection molding machines of the type for the injection-molding of shoe soles on prepared shoe uppers.

When injection-molding shoe soles on prepared shoe uppers (which may be manufactured from leather, artificial leather or alternatively from woven textiles fabrics) use is generally made of a multi-part injection molding mold. The mold generally consists of a last carrying the shoe upper, two lateral jaws and a sole plate. These four parts define a mold cavity which has the contours of the sole into which project the edges of the shoe upper which is clamped on the last. The feed of the sole material (which may consist for example of soft PVC, rubber or some other suitable material) to the mold cavity is effected by a sprue arrangement in the sole plate. The sprue can be connected at its forward end, by a feedhead sleeve, to an injecting unit of conventional design. The sprue opens out into the mold cavity through a series of connecting bores.

For retaining and guiding the individual parts of the injection molding mold, use is made of a mold carrying unit. In practice it it is preferable to set up a multiplicity of such mold carrying units on a turntable which rotates intermittently at a pre-determined rate. Thereby the individual mold carrying units one after the other are conveyed to a position in front of the stationary injection molding unit and also to the other processing stations. With the aid of a turntable installation of this kind, extremely high production outputs can be achieved.

A presently known embodiment of mold carrying unit consists of a base frame having a horizontal base plate and a vertically projecting stand. Secured on the base plate is a mold box in which the two lateral jaws of the mold are mounted horizontal displacement relative to each other. The actuation of the lateral jaws is effected by means of hydraulic actuating cylinders arranged in the opposite lateral walls of the mold box. The sole plate is also disposed within the mold box and is, when the lateral jaws are closed, surrounded thereby with vertically extending parting lines.

However, the sole plate is not mounted in the mold box but bears on a separate bracket which is arranged below the lateral jaws and is supported on a multiplicity of plungers or pistons slidably guided through the base plate of the mold box. The plungers are connected with a hydraulic pressure unit arranged in the base frame below the base plate. The hydraulic pressure unit is normally disposed in its lower end position which is defined accurately by stops. Providing the pressure unit makes it possible, after the injection-molding step has been concluded, to lift the bracket together with the sole plate relative to the two lateral jaws mounted in the mold box, so as to act on the shaped sole with a certain amount of additional pressure.

In known mold units, the last with the shoe upper is attached on a slide or carriage which is adapted to be vertically displaced along a guide on the vertical stand, for example, by means of a hydraulic unit arranged in the stand. It is preferable, but not necessary, to connect the last with the slide by a turret head (or revolving head) onto which further similar lasts may be attached. In the lowered state of the slide, the last seals off the top of the cavity of the mold. In the raised state, the slide frees the last so that the finished shoe may be removed and so that a new shoe upper may be inserted on the last.

To close the mold cavity, it is possible to proceed in various ways, depending on the nature of the sole to be injection-molded on the shoe upper. If the edges of the sole are joined to the lower edge of the shoe upper, then first the two lateral jaws are closed. Next the last with the shoe upper is placed above and on the edge of the closed lateral jaws.

In the case of sole edges which are drawn up further and which also surround the upper laterally, the last with the upper drawn on must, while the lateral jaws are still open, be lowered. The jaws subsequently embrace the upper laterally along the contours of the sole. In each case, the actuating device serving to raise and lower the last has a fixed pre-determined lower stroke position which imparts an exactly defined lower end position to the last. When the actuating device consists of a hydraulic actuating cylinder, the lower stroke limitation is generally produced by stops arranged within the cylinder and cooperating with the cylinder piston.

The mold carrying units described above have been found to be satisfactory. It has, however, been established in practice that with these units it is possible but difficult to vary the thickness of the sole to be injection-molded on the shoe upper. The step which would be obvious, i.e. to vertically adjust the sole plate forming the lower closure of the mold and thereby to achieve varying sole thickness is extremely difficult to carry out because it is then also necessary to correspondingly raise or lower the injection molding unit in order that the sole plate, with the sprue extending in it, may always be exactly flush with the nozzle of the injection molding unit. For this reason, in the event of a variation in the sole thickness, the procedure has generally been to fit new mold parts, for example a new sole plate, in the mold carrying unit. This results in a considerable amount of reassembly and readjustment which is required to be done. In addition, it is necessary to keep a large number of mold parts in stock.

SUMMARY OF THE INVENTION

In a principal aspect, the present invention comprises a mold carrying unit which uses those features of known mold carrying units which are essential and have been proved to be satisfactory, but which, in addition, makes it possible, in an extremely simple and convenient manner and above all without requiring the fitting of new mold parts, to fabricate any desired thickness in the sole to be injection molded on the shoe upper. This is achieved by arranging the mold box which carries the lateral jaws to be vertically adjustable on the base plate of the mold carrying unit. Preferably, there is provided on the base plate a plurality of screw bolts by which the mold box can be tightly screwed in varying vertical positions.

The spacing between the upper edges of the lateral jaws mounted in the mold box and the base plate of the mold carrying unit can be adjusted in an infinite variety of manners. Simultaneously, the sole plate, since it is mounted independently of the mold box on the bracket carried by the plungers, remains vertically fixed relative to the base plate and consequently also relative to the injection molding unit. The sprue remains flush with the injection molding unit. By varying the clear or free height of the mold cavity, measured from the upper edges of the lateral jaws as far as the upper edge of the sole plate, there results a desired variation in the thickness of the soles injection-molded on the shoe upper.

To close the mold cavity, it is possible to proceed in the hitherto conventional manner. The last may be placed in position on the lateral jaws which are already closed, or alternatively it is also possible to lower the last before the closure of the lateral jaws takes place. It is preferable, when varying the sole thickness adjustment, not only to adjust the mold box relative to the base plate of the mold carrying unit, but also to adjust the lower stroke limitation of the vertical last actuating device. When using a last actuating cylinder which has a stroke limiting stop arrangement in the cylinder, adjustment can be effected simply by connecting the actuating cylinder with the vertical stand of the mold carrying unit thereby to be vertically adjusted as an entire unit.

BRIEF DESCRIPTION OF THE DRAWINGS

Further details of the invention will be discussed in detail in the following text with reference to an example of a preferred embodiment and with reference to the drawings, wherein.

DESCRIPTION OF THE PREFERRED EMBODIMENT

Figure 1:
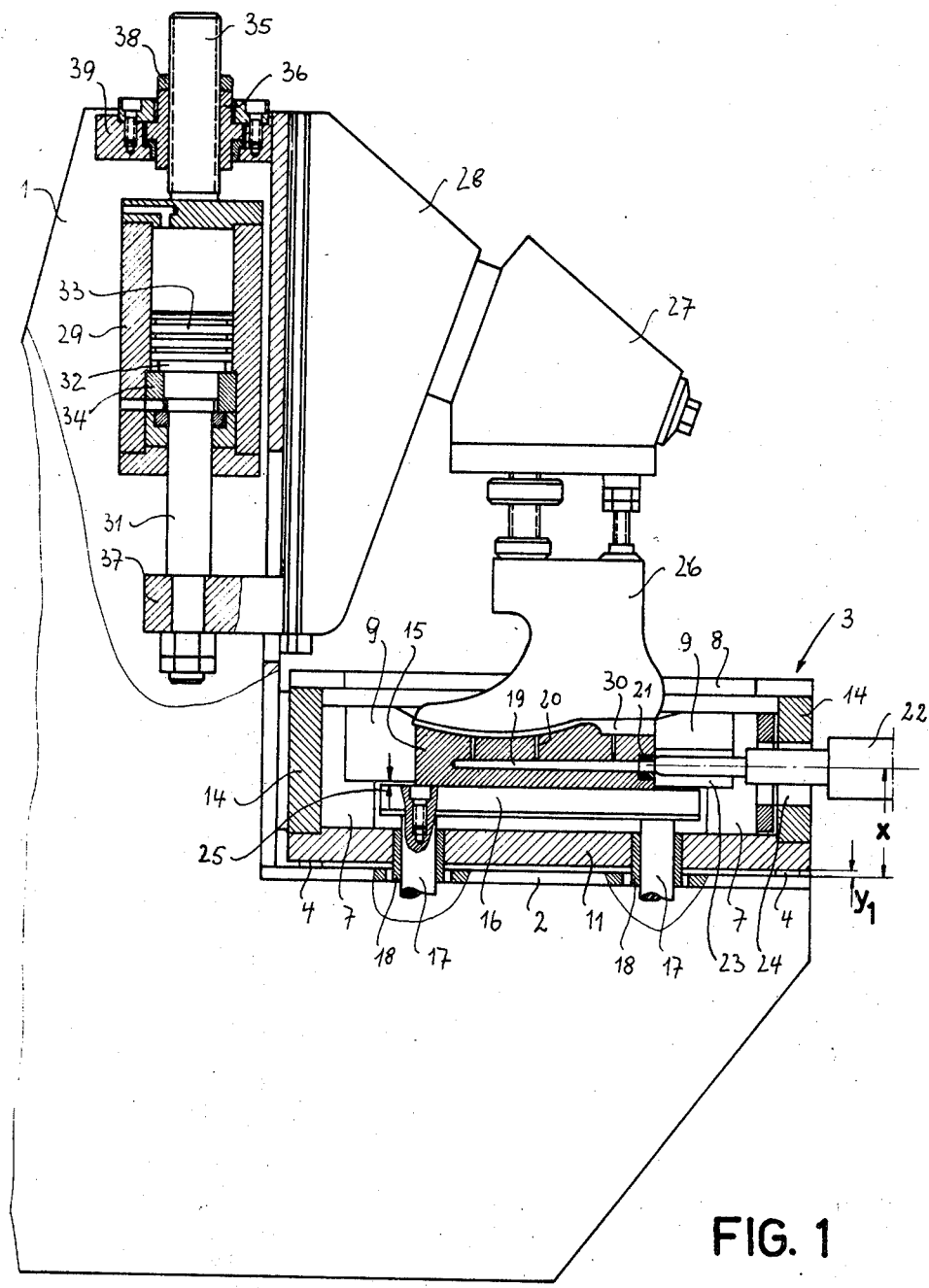
FIG. 1 shows a partly sectioned elevation of a mold carrying unit designed in accordance with the invention.

In the mold carrying unit shown in the drawings, it has been assumed that the unit is a carrier unit arranged on a conventional automatic turntable installation. The carrier unit is, as the turntable is rotated, displaced in sequence to an injection molding unit and onto the remaining processing stations. The base frame of the mold carrying unit has a vertically projecting, angular stand or standard 1 and a horizontal base plate 2. Secured in a vertically adjustable position on the base plate 2 by the screw bolts 4 is a molded box 3. The mold box serves to mount the two lateral jaws 9 and 10 which, together with a last 26 and a sole plate 15 comprise the injection mold.

The mold box consists of the base plate 11, two lateral walls 13 and two end-face walls 14. The lateral walls 13 and a portion of the end-face walls 14 are adapted to be covered by upper cover plates.

Figure 4:
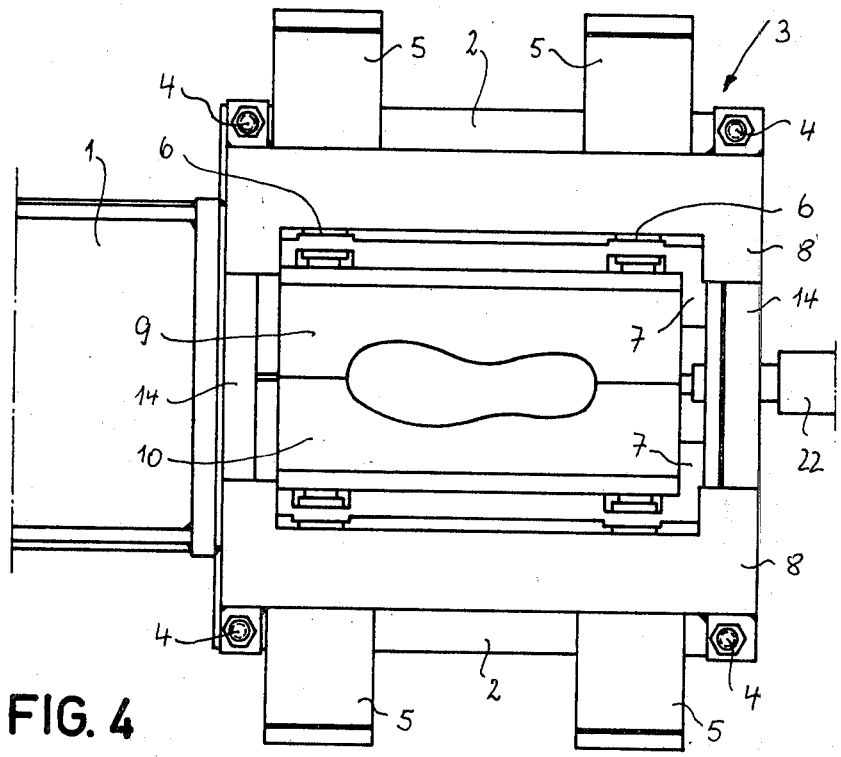
FIG. 4 shows a plan view of the mold box used with the unit illustrated in FIGS. 1 and 2.

Arranged on each of the lateral walls 13 are two hydraulic cylinders 5. Piston rods 6, which extend into the interior of the box 3, are connected on each side of the box 3 with a molding jaw carrier 7 for receiving the lateral jaws 9 and 10. Simultaneously, the lateral jaws 9 and 10 are guided by means of the holding jaw carriers 7 on the end-face wall 14 and on the base plate 11 in such manner that, by actuation of the cylinders 5, they can be displaced towards each other into their closed position as shown in FIG. 4 or away from each other into their open position (not shown).

The sole plate 15, in the closed position of the lateral jaws 9 and 10, is embraced by the jaws 9 and 10. The sole plate 15 is disposed on a bracket 16 which is connected, independently of the mold box 3 by two pistons 17 with the stand 1. The two pistons 17 extend through bushed recesses 18 in the base plate 11 of the mold box 3. They are connected with an hydraulic unit (not shown) which is arranged in the base frame below the base plate 2 and which is normally disposed in a lower end position accurately defined by stops. The lateral jaws 9 and 10 are formed with an air gap 25 on their underside. The air gap 25 provides adequate space for the bracket 16 carrying the sole plate 15. As a consequence of this arrangement, the lateral jaws 9 and 10 are able, when the mold box 3 is vertically adjusted, to move relative to the sole plate 15, without hindrance by the bracket 16.

Formed in the sole plate 15 is a sprue 19. A multiplicity of bores 20 extend from the sprue 19 to the surface of the plate. In the heel direction, the sprue 19 ends in a sprue sleeve 21 which serves to connect the nozzle 22 of an injection molding machine (not shown). The nozzle 22 extends through a duct 23 formed at the heel end in the lateral jaws 9 and 10 and through a recess 24 in the front end-face wall 14 of the mold box 3.

The last 26 is arranged above the mold box 3. It carries a shoe upper and is mounted for vertical displacement with a slide 28 along a guide on the stand or upright of the base frame. There may be attached to the slide 28 a turret head 27 which, in addition to the last 26, carries also a further last (not shown). For the displacement of the slide 28 together with the turret head 27 and the last 26, there is a hydraulic cylinder 29. The cylinder 29 is secured in the stand 1. The piston rod 31 engages on a projection 37 on the slide 28 which projects into the stand 1.

In the lower end position of the slide 28, the last 26 forms the upper closure of the injection molding mold. The mold is further defined by the two lateral jaws 9 and 10 and also of the sole plate 15. There is formed within the injection mold a mold cavity 30 into which project the edges of the shoe upper secured on the last. The mold cavity 30 has the contours of the sole which is to be injection molded onto the shoe upper. The cavity 30 may be filled with sole material through the sprue 19 and the bores 20, from the injection molding unit.

After the injection process has been completed, the last 26 is raised by appropriate actuation of the slide 28, so that the mold opens. To draw off of the finished shoe and to secure new shoe upper in position, for example, for replacement with a new last prepared with a shoe upper, the last is pivoted on the turret head 27. If appropriate the next last attached to the turret head then moves into the working position.

Figure 2:
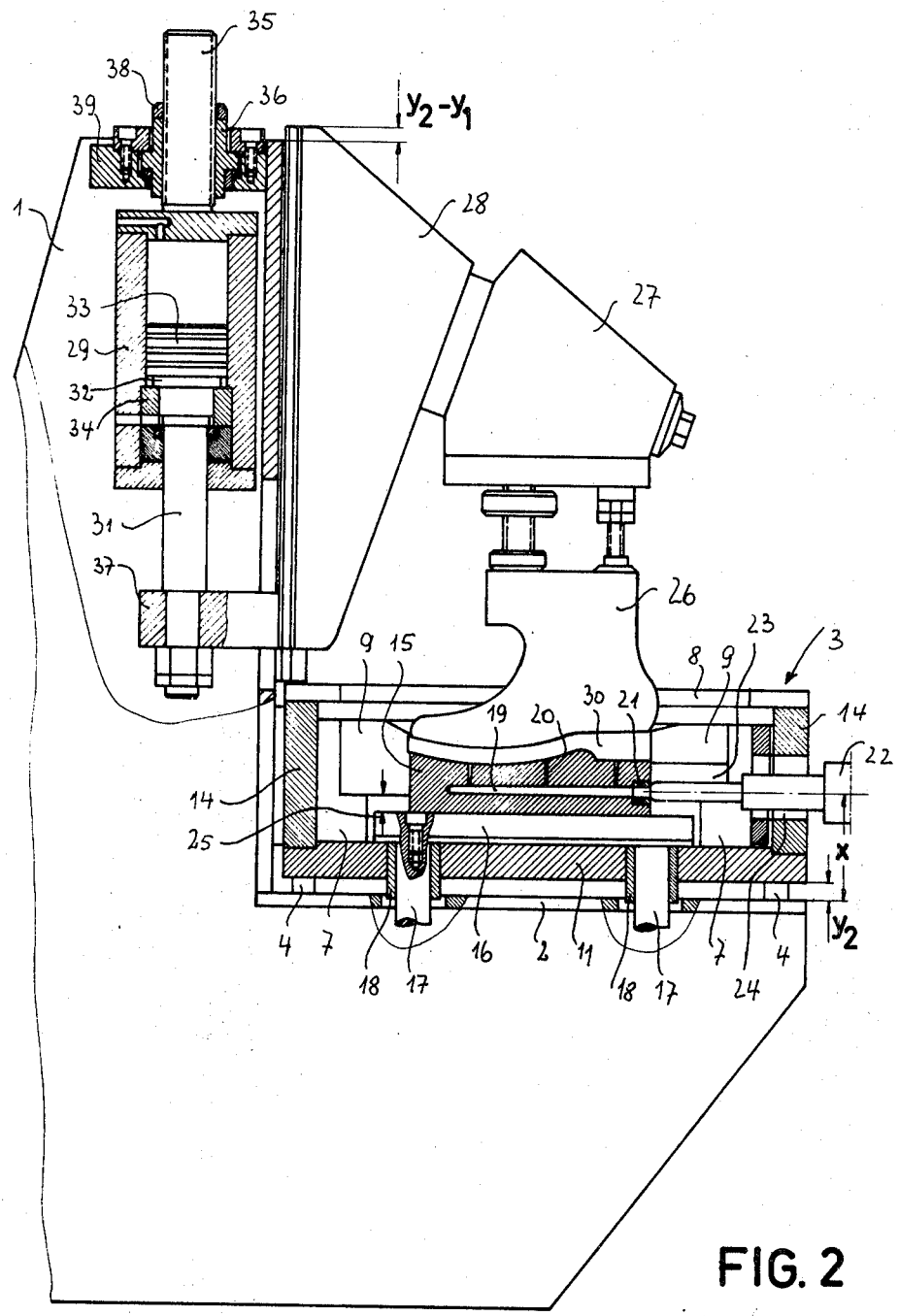
FIG. 2 shows the mold carrying unit according to FIG. 1 after the sole thickness adjustment has been varied.
Figure 3:
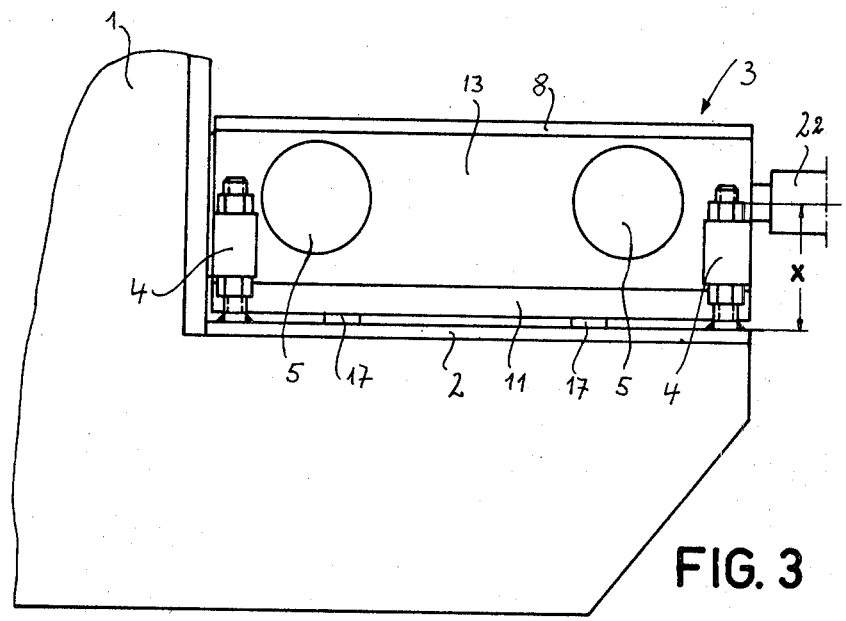
FIG. 3 shows an elevation of the mold box used with the unit illustrated in FIGS. 1 and 2.

Adjustment of varying sole thicknesses in the above-described mold carrying unit is effected by varying the spacing of the mold box 3 relative to the base plate 2 by means of the vertical adjustment screw 4. The variation may be, for example, from spacing $y_1$, as shown in FIG. 1, to spacing $y_2$, as shown in FIG. 2. At the same time, the lateral jaws 9 and 10 mounted in the mold box 3 are also given a corresponding varied spacing from the base plate 2. The sole plate 15 mounted on the bracket 16 retains its position. This produces a greater free height of the mold cavity 30. At the same time the sprue sleeve 21 in the sole plate 15 continues to have the spacing $x$ from the base plate which is necessary for proper alignment with the nozzle 22 of the injection molding machine.

Independently of whether the last 26 is lowered onto the closed lateral jaws 9 and 10 or whether the last 26 is lowered before the lateral jaws 9 and 10 have been closed, the stroke of the hydraulic cylinder 29 must be fixed. The stroke is limited so that the last 26 may, after the lowering movement, adopt the correct vertical position relative to the sole plate 15 and relative to the upper edges of the lateral jaws 9 and 10. This stroke limitation is, in the case of the example of embodiment illustrated, achieved by means of a collar 32 which is provided on the piston 33 of the hydraulic cylinder 29. The collar 32, during the downward stroke of the piston, impinges against a stop 34 disposed in the cylinder 29 and limits the downward stroke.

When varying sole thickness to insure the correct position of the lowered last relative to the remaining parts of the injection, the height of the lateral jaws 9 and 10 must be adjusted by vertically adjusting the mold box 3. In addition the stroke limitation of the last 26 must be adjusted to correspond to the difference between the old mold box spacing and the new mold box spacing (i.e. for example by the amount $y_2-y_1$). In the case of the embodiment illustrated, the hydraulic cylinder 29 is connected by a screwthreaded pin 35 and an internally tapped bushing 26 with the stand 1. The bushing 36 is rotatably mounted on a stand-side bearing plate 39 and is normally secured by a lock nut 38. By rotating bushing 36 within the bearing plate 39, vertical adjustment of the cylinder 29 and of the stop 34 arranged in the cylinder is affected. Thus there is produced an accurately defined variation in the degree of lowerability of the last 26.

As a whole, due to vertical adjustment of the mold box and due to subsequent adjustment of the last-side stroke limitation, easy variation of the sole thickness adjustment may be effected without greatly disturbing production lines.

It is self-evident that the invention is not limited to the example of embodiment illustrated. For example, it is immaterial by what means the lateral jaws are pressed one against the other or the last 26 is lowered.

What is claimed is:

1. An improved shoe sole molding device having integral means for adjusting sole thickness comprising, in combination, a last mounted for vertical movement and cooperating with a horizontal sole plate and lateral jaws to define a mold cavity, said sole plate including a sprue for injection of sole material into said mold cavity, said sole plate being immovably fixed in position on a base plate so that said sprue connects with a source of sole material, said jaws being fixed in and relative to a mold box, said jaws and box being vertically slidably positioned about said sole plate, means for adjusting the vertical position of said mold box so that said jaws may be vertically positioned to provide a desired sole thickness, and means for adjusting the vertical movement of said last to provide a desired sole thickness.

2. The device of claim 1 wherein said last achieves vertical movement in response to a piston structurally connected with said last, and said means for adjusting the vertical movement of said last includes means for adjusting the stroke of said piston.

3. The device of claim 1 wherein said means for adjusting the vertical position of said mold box include a plurality of adjustable screw bolts for mounting said mold box on said base plate.

References Cited

UNITED STATES PATENTS

| 3,131,432 | 5/1964 | Battell et al. |
|---|---|---|
| 3,203,049 | 8/1965 | Brown et al. |
| 3,305,895 | 2/1967 | Ludwig. |
| 3,315,317 | 4/1967 | Winkler. |
| 3,319,301 | 5/1967 | Ludwig. |
| 3,339,236 | 9/1967 | Battell et al. |
| 3,343,223 | 9/1967 | Ludwig. |
| 3,358,333 | 12/1967 | Kitchener et al. |
| 3,413,682 | 12/1968 | Wucher. |

J. HOWARD FLINT, JR., Primary Examiner

U.S. Cl. X.R.

18—30